Patented Nov. 14, 1922.

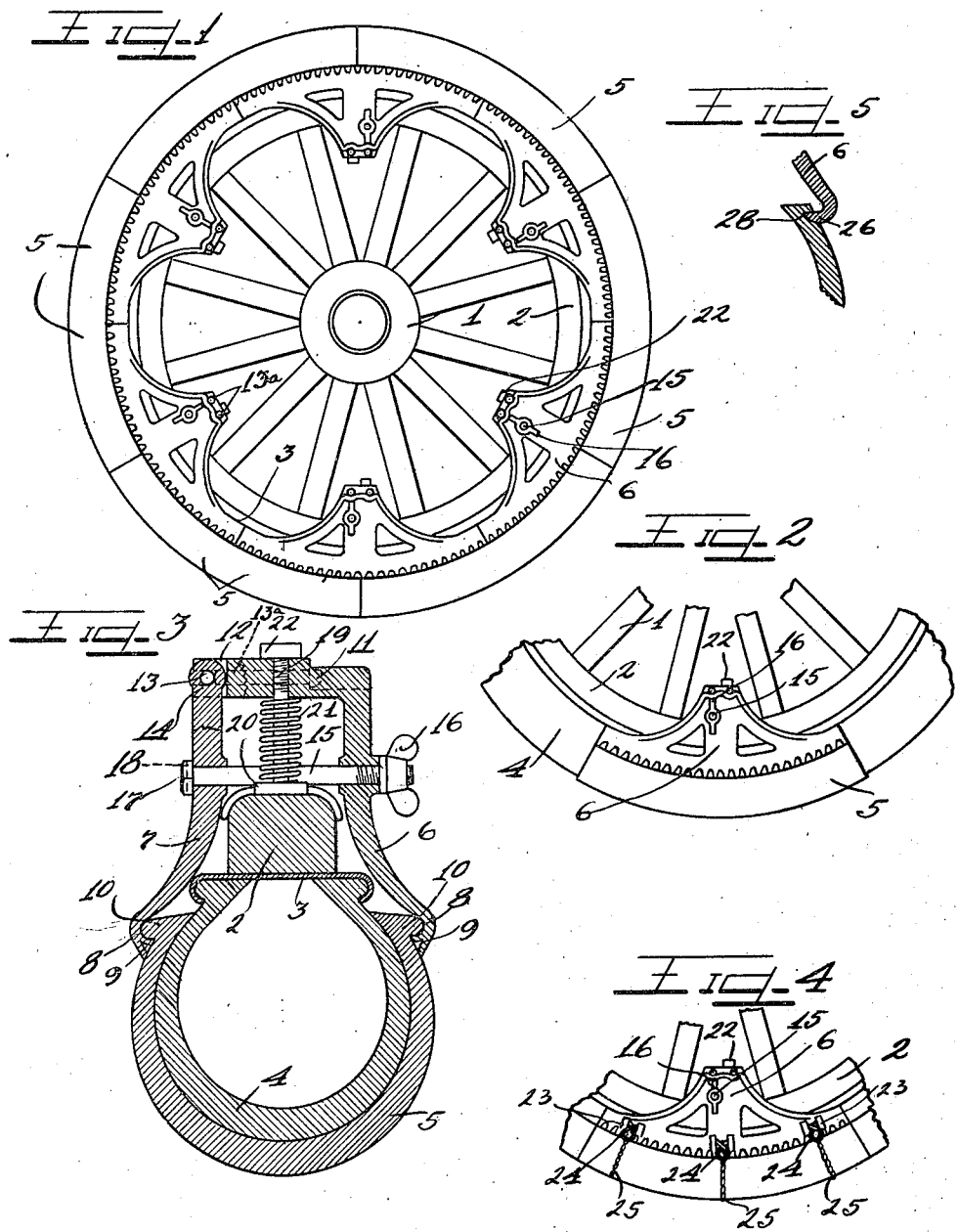

1,435,338

UNITED STATES PATENT OFFICE.

AUGUST P. SCHEIN, OF MORTON GROVE, ILLINOIS, ASSIGNOR OF ONE-HALF TO GEORGE BUSSCHER, JR., OF NILES CENTER, ILLINOIS.

AUXILIARY ATTACHMENT FOR PNEUMATIC TIRES.

Application filed November 5, 1921. Serial No. 512,962.

*To all whom it may concern:*

Be it known that I, AUGUST P. SCHEIN, a citizen of the United States, and a resident of the village of Morton Grove, in the county of Cook and State of Illinois, have invented certain new and useful Improvements in an Auxiliary Attachment for Pneumatic Tires; and I do hereby declare that the following is a full, clear, and exact description of the same, reference being had to the accompanying drawings, and to the numerals of reference marked thereon, which form a part of this specification.

This invention relates to an auxiliary attachment for pneumatic tires and particularly to a device which makes possible the use of parts of worn tire casings. When a portion of a tire casing becomes worn so that it cannot be repaired, it is the general practice to discard the same or to sell the same for the scrap rubber therein, no effort being made to utilize unworn parts of the tire casing. This practice is of course a wasteful one and it is an object of the present invention to provide means whereby unworn portions of used tire casings may be readily utilized in the repair or in the protection of pneumatic tires that are in use on vehicle wheels.

It is also an object of this invention to provide means whereby portions of the tire casing may be clamped over a pneumatic tire in position on a wheel to reinforce or repair the same.

It is a further object of this invention to provide a clamp which is adapted to coact with a wheel to removably secure a reinforcing member on a pneumatic tire which is mounted on the wheel.

It is an important object of this invention to provide an attachment for vehicle wheels which permits of the utilization of portions of worn tire casings in the reinforcement and repair of pneumatic tires mounted on said wheels.

Other and further important objects of this invention will be apparent from the disclosures in the specification and the accompanying drawings.

The invention (in a preferred form) is illustrated in the drawings and hereinafter more fully described.

On the drawings:

Figure 1 is a side elevation of a wheel having a pneumatic tire which is completely covered by portions of tire casings held in place by the auxiliary attachments of this invention.

Figure 2 is a fragmentary side elevation of a wheel and pneumatic tire showing one of the reinforcing attachments secured thereon.

Figure 3 is an enlarged central vertical section through the attaching and reinforcing means showing the method of securing the same in position over a pneumatic tire.

Figure 4 is a view similar to Figure 2 showing the attaching means adapted for anti-skid devices.

Figure 5 is a fragmentary detail showing the attachment adapted for use with straight side tire casings.

As shown on the drawings:

The reference numeral 1 indicates an ordinary vehicle wheel such as an automobile wheel which has a pneumatic tire and rim mounted on its felloe 2, the rim shown in the illustrations being the ordinary clincher rim and being represented by the reference numeral 3, while the tire casing is represented by the reference numeral 4. In order to reinforce worn or damaged portions of said tire casing 4 a segment of a similar tire casing which is ordinarily cut from an unworn portion of an old tire casing is engaged over the outside of said tire casing 4, said segments herein being represented by the reference numeral 5. Said segments 5 may be arranged to completely cover the tire casing 4 by providing a plurality thereof as shown in Figure 1, or a single segment may be used to cover a particular portion of the tire casing as shown in Figure 2, the segments in either case being secured in position on the tire casing by the improved attaching means of this invention, which will now be described.

Said attaching means comprises plates 6 and 7 which have arcuate grooves 8 formed on the inner sides of their outer edges and which have hook portions 9 integrally formed along the inner edges of said arcuate grooves thereby adapting the same to be firmly engaged over the beads 10 of the tire casing segments 5. The plate 6 extends inwardly on one side of the felloe 2 and is provided with an integral transverse portion 11 which extends between the spokes of the wheel to the other side of the felloe 2 and is provided with recessed extensions 12 which are adapted to receive the ends of pins 13 which extend outwardly from a reduced portion 14 formed on the inner end of the plate 7. Said pins 13 are held in adjusted position relative to the recesses in the extensions 12 by means of set screws 13ª engaged in threaded apertures in the transverse portion 11. The plates 6 and 7 are adapted to be drawn toward each other and toward the felloe 2 by means of a bolt 15 which is engaged through registering apertures in said plates and which has a wing nut or other suitable tightening nut 16 mounted on its outer end on the outside of the plate 6, said bolt preferably being prevented from rotation relative to the plates by the engagement of a head 17 thereon with shrouds 18 which are integrally formed on the outside of the plate 7. It is thus apparent that the clamping effect of the plates 6 and 7 on the segment 5 may be varied by tightening or loosening the wing nut or other tightening means 16.

A resilient connection between the attaching means and the felloe is afforded by a bolt 19 which extends through the transverse portion 11 of the plate 6 and which is provided at its inner end with a button 20 rotatably mounted thereon and in engagement with the inner side of the felloe 2. Engaged between said button 20 and the inner side of the transverse portion 11 is a helical spring 21 and the amount of compression exerted on said spring may be varied by the adjustment of a nut 22 which is mounted on the bolt 19 on the outside of said transverse portion 11. By the adjustment of said nut 22 it is of course possible to vary the pulling effect which is exerted on the segments 5 by the plates 6 and 7.

Means which are illustrated in Figure 4 may be provided for the attachment of anti-skid devices to the plates 6 and 7, said means preferably comprising bifurcated bosses 23 which are adapted to receive the inwardly turned ends of spring clips 24 to which anti-skid members 25 are attached. By this arrangement, the anti-skid devices may be quickly and conveniently secured in position around the segments 5.

Figure 5 illustrates an arrangement whereby the attaching means of this invention may be used in connection with straight side tires or tires which are not provided with the ordinary clincher beads 10. This is affected by the provision of a plurality of inwardly extending teeth 26 which are formed along the edges of the plates 6 and 7 and which are adapted to project into the side walls of the reinforcing segments at the thickened portions 28 thereof.

The use and operation of the auxiliary attachment of this invention will be obvious from the foregoing description and need only be generally described herein. When it is only desired to repair a portion of a tire casing, it is ordinarily sufficient to use one of the attaching means, thereby clamping a segment of tire casing of suitable length over the worn or damaged portion of the tire. In case the entire tire becomes worn, an arrangement similar to the one illustrated in Figure 1 may be employed, it of course being understood that any number of attaching means and reinforcing segments may be used to meet the particular needs of the tire which is to be reinforced.

It will be apparent from the foregoing description that this invention provides a method whereby the unworn portions or used tire casings may be advantageously used in the reinforcement or repair of pneumatic tires, and by the use of this invention the waste attendant upon the throwing away of old tire casings or the sale of the same for scrap rubber is greatly minimized.

While the attaching means are preferably constructed of light metal such as an aluminum composition, it will of course be apparent that any suitable material may be used in the construction thereof and that various changes may be made and details of construction varied through a wide range without departing from the principles of this invention, and it is therefore not purposed to limit the patent granted otherwise than necessitated by the prior art.

I claim as my invention:

A clamp for holding a tire protective section, comprising a transverse member adapted for spanning the felloe of a wheel, a clamping member integral therewith and having a hooked-shaped periphery adapted for engaging the bead of a tire and a second similar member pivoted to said transverse member and an adjustable transverse bolt connecting said clamping members.

In testimony whereof I have hereunto subscribed my name in the presence of two subscribing witnesses.

AUGUST P. SCHEIN.

Witnesses:
CARLTON HILL,
JAMES M. O'BRIEN.